UNITED STATES PATENT OFFICE.

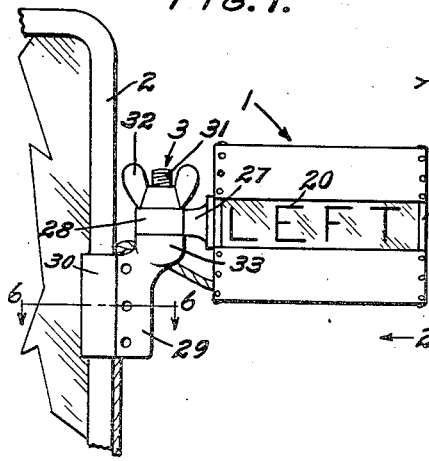
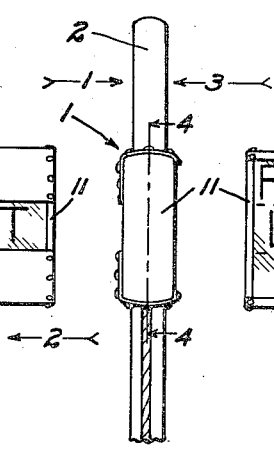
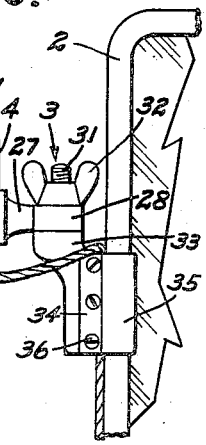
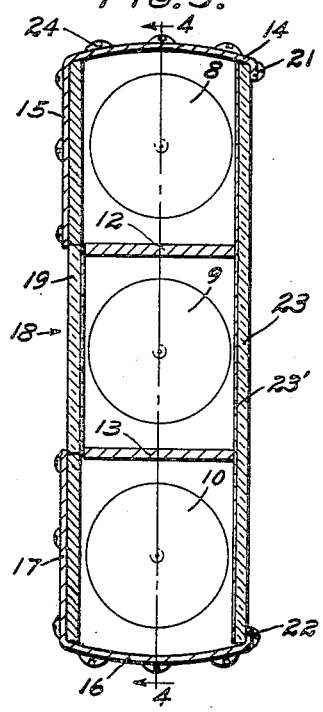
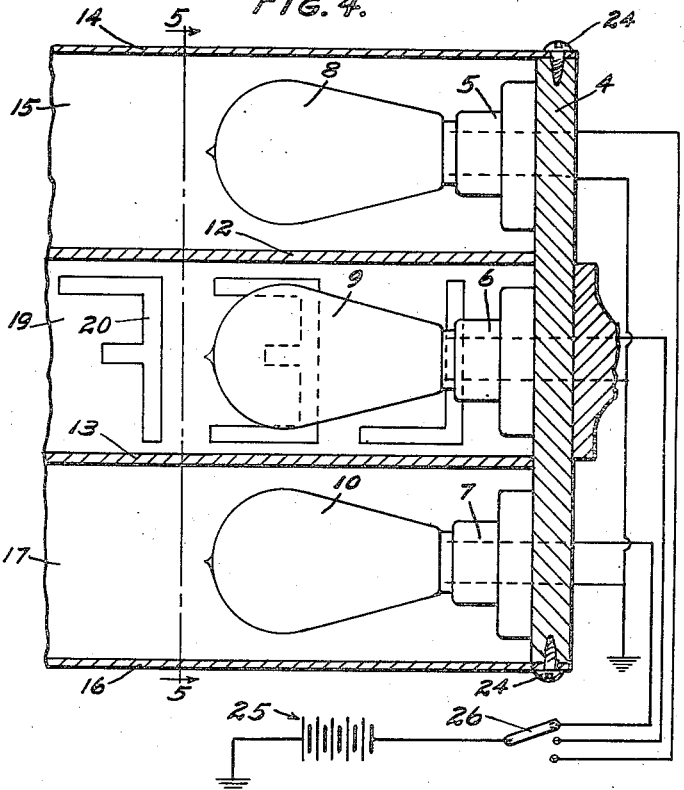
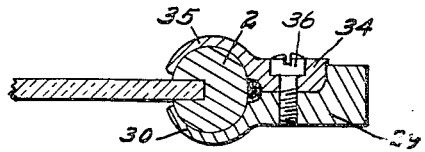

CHARLES L. RAY, OF LOS ANGELES, CALIFORNIA.

DIRECTION-INDICATOR AND MIRROR.

1,304,370.  Specification of Letters Patent.  Patented May 20, 1919.

Application filed March 3, 1919. Serial No. 280,389.

*To all whom it may concern:*

Be it known that I, CHARLES L. RAY, a citizen of the United States, residing at Los Angeles, in the county of Los Angeles and State of California, have invented new and useful Improvements in Direction-Indicators and Mirrors, of which the following is a specification.

My object is to make a direction indicator and mirror, and my invention consists of the novel features herein shown, described and claimed.

Figure 1 is a front elevation of a direction indicator and mirror, embodying the principles of my invention, in position for use and attached to the side bar of a wind shield, the wind shield being broken away, and the view being taken looking in the direction indicated by the arrow 1 in Fig. 2.

Fig. 2 is an outer edge view looking in the direction indicated by the arrow 2 in Fig. 1.

Fig. 3 is a rear elevation looking in the direction indicated by the arrow 3 in Fig. 2.

Fig. 4 is an enlarged fragmentary sectional detail on the lines 4—4 of Figs. 2 and 5.

Fig. 5 is a vertical cross section on the lines 5—5 of Figs. 3 and 4, and looking in the direction indicated by the arrows.

Fig. 6 is a sectional detail on the line 6—6 of Fig. 1.

The direction indicator and mirror 1, shown in Figs. 1 and 3, is rectangular in elevation and is mounted upon the side bar 2 of a wind shield by a bracket construction 3.

The details of the indicator and mirror 1 are as follows:

The head 4 has lamp sockets 5, 6 and 7 fixed to its inner face in a vertical line. Lamps 8, 9 and 10 are mounted in the sockets 5, 6 and 7. The head 11 is practically the same size and shape as the head 4, and partitions 12 and 13 are fixed to the head 11 to extend between the lamps 8 and 9 and between the lamps 9 and 10. A metallic casing 14 is secured to the upper edge of the head 11 and has a portion 15 extending downwardly along the side edge of the head in front of the lamp 8. A similar metallic casing 16 is secured to the lower edge of the head 11 and has a portion 17 extending upwardly along the side edge of the head in front of the lamp 10, thus leaving a space 18 between the portions 15 and 17. A glass plate 19 is mounted against the inner faces of the portions 15 and 17 and against the partitions 12 and 13, and lettering 20 is formed upon the plate in the space 18, said lettering reading "Left", and said lettering appearing upon the front side of the indicator, as shown in Fig. 1. The plate 19 is finished so that the lettering will be illuminated and readable at night or day with the lamp 9 turned on.

The indicator 1 is supposed to be mounted upon the left-hand side of the automobile and to take the place of the operator's left hand in giving signals as to the proposed operation of the automobile and it is only necessary to give the "left" signal to the front.

The edges 21 and 22 of the casings 14 and 16 extend a short distance toward each other, and a glass plate 23 is inserted against the partitions 12 and 13 and held in place by these edges 21 and 22. The glass plate 23 is silvered as indicated by 23' to act as a mirror, and the silvering is lettered, so that the lettering "Right" will appear behind the lamp 8, "Left" behind the lamp 9 and "Stop" behind the lamp 10, so that any one of the letterings may be read night or day with the corresponding lamp turned on, and so that the plate 22 will serve as a mirror in which the operator may see what is going on behind him. The casings 14 and 16 are fixed to the head 11 to hold the parts together and are adapted to fit removably upon the head 4 and are held in place by screws 24 inserted through the casings into the head 4, so that by removing the screws the entire mechanism may be removed from the head 4 to provide access to the lamps 8, 9 and 10. The lamps 8, 9 and 10 are electrically operated from the battery 25 grounded upon the frame of the automobile and leading through a three-way switch 26, so that by manipulating the switch either one of the lamps may be turned on or all the lamps may be turned off. The switch 26 may be mounted in any convenient position upon the instrument board or other part of the automobile.

The details of the bracket construction 3 are as follows:

An arm 27 is rigid with the head 4 and has a vertical bearing 28. A clamping plate 29 has a jaw 30 to engage the side bar 2 and a screw threaded pintle 31 extending upwardly through the bearing 28. A wing nut 32 is screwed down upon the pintle 31 to clamp the bearing 28 against the head 33 around the lower end of the pintle. A second clamping plate 34 fits the clamping plate 29 and has a jaw 35 engaging the other side of the side bar 2, and the clamping plates are held together by cap screws 36. By manipulating the cap screws 36 the bracket construction may be raised or lowered to the desired position upon the side bar 2, and then the screws tightened to hold the indicator in place. By manipulating the wing nut 32 the indicator may be swung upon the pintle 31 to any desired position, so that the mirror will stand in proper relation to the operator.

Thus I have produced a direction indicator and mirror all in one construction, and so that all of the requirements of the direction indicator and mirror will be fulfilled by a single construction. That is, it is not necessary to have one at the front end of the automobile and another at the rear end, or to have one upon the right side and another upon the left side. By placing a single construction upon the left side, as seen by the operator, duplication is unnecessary.

Various changes may be made without departing from the spirit of my invention as claimed.

I claim:

1. A direction indicator and mirror comprising an indicator and mirror construction adapted to be mounted upon the left-hand side of a wind shield frame, and have the lettering Left showing from the front and letterings Right, Left and Stop showing from the rear, the rear side being silvered to serve as a mirror, and there being means for illuminating the lettering.

2. In a direction indicator and mirror, a head, three lamp sockets secured to the head in a vertical row, lamps in the lamp sockets, partitions between the lamps, a casing surrounding the lamps and secured to the head, glass plates mounted in the casing in front of and behind the lamps, means for covering the upper and lower lamps on the front side, lettering in front of the uncovered lamp, lettering upon the rear plate behind the lamps, and silver upon the rear plate to produce a mirror.

In testimony whereof I have signed my name to this specification.

CHAS. L. RAY.